United States Patent [19]

Cheung

[11] Patent Number: 5,065,794

[45] Date of Patent: Nov. 19, 1991

[54] GAS FLOW DISTRIBUTION SYSTEM

[75] Inventor: Steven D. Cheung, Danbury, Conn.

[73] Assignee: Union Carbide Industrial Gases Technology Corporation, Danbury, Conn.

[21] Appl. No.: 617,768

[22] Filed: Nov. 26, 1990

[51] Int. Cl.$^5$ .............................................. F16K 11/10

[52] U.S. Cl. ..................................... 137/883; 137/599

[58] Field of Search ........................ 137/883, 884, 549

[56] References Cited

U.S. PATENT DOCUMENTS 3,464,447 9/1969 Jones .................................. 137/883

4,714,091 12/1987 Wagner .............................. 137/884

OTHER PUBLICATIONS

"Ultra Clean Gas Delivery System", K. R. Grosser, *Technical Proceeding Semicon/East* Sep., 1989, pp. 7–15.

"Examining Performance of Ultra-High-Purity Gas, Water, and Chemical Delivery Subsystems", Tadahiro Ohim, et al., *Microcontamination,* Mar., 1990, pp 27–33 and pp. 60, 62 and 63.

"Design and Performance of the Bulk Gas Distribution System in The Advanced Semiconductor Technology Center (ASTC)", Bradley Todd, et al., Proceedings, *Microcontamination,* Oct., 1989, pp. 1–17.

"Installing and Certifying Sematech's Bulk Gas Delivery Systems", T. F. Fisher et al., *Microcontamination,* May, 1990, pp. 23–33.

*Primary Examiner*—John C. Fox

*Attorney, Agent, or Firm*—Alvin H. Fritschler

[57] ABSTRACT

Gas distribution system including main, lateral and loop conduits in which gas flow is continuously provided between a source of pressurized gas and venting means so that "dead space" is avoided in the distribution system and continuous real time monitoring of system gas is enabled.

8 Claims, 8 Drawing Sheets

FIG. 6
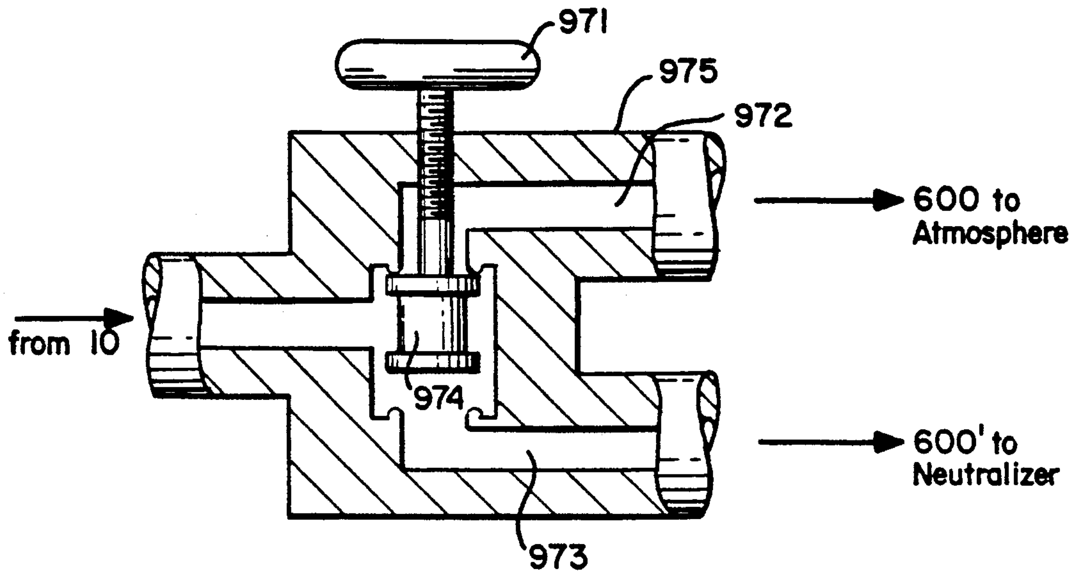
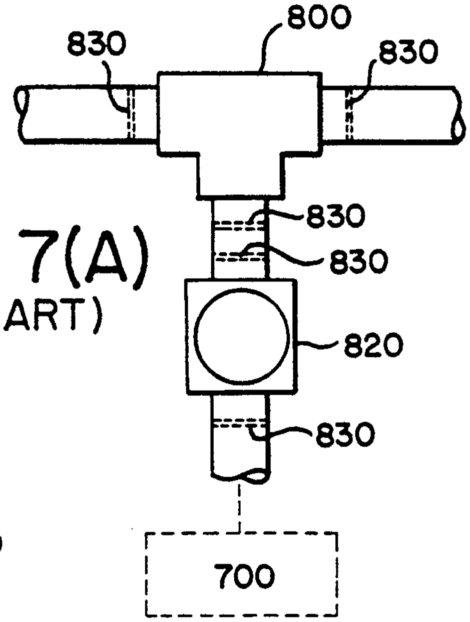
FIG. 7(A)
(PRIOR ART)
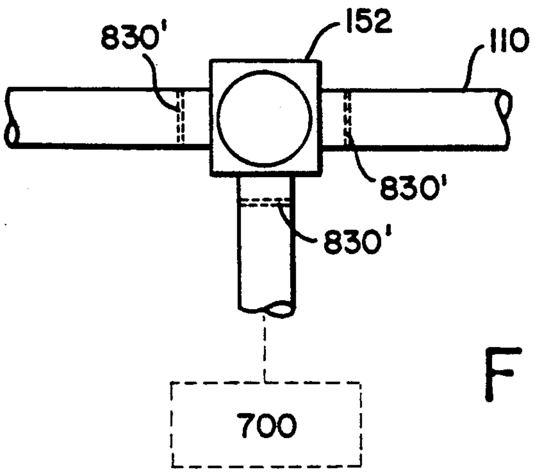
FIG. 7(B)

GAS FLOW DISTRIBUTION SYSTEM

FIELD OF THE INVENTION

The present invention relates to a system for the distribution of gas or fluid. More particularly the present invention is directed to a continuous flow gas distribution system for the distribution of very high purity gas to a plurality of outlets from which the very high purity gas can be delivered to processing equipment, e.g. for semiconductor manufacturing purposes and the like.

BACKGROUND OF THE INVENTION

The need for very high purity process gases has always been a serious concern of the semiconductor industry and with the evolution of semiconductor device manufacturing from VSLI (Very Large Scale Integration) to ULSI (Ultra Large Scale Integration) the availability of process gas with increased purity e.g. from parts-per-million (ppm) to parts-per-billion (ppb) is imperative and parts-per-trillion purity requirements are expected for the 1990's.

The manufacture of process gases (e.g. oxygen, argon, hydrogen, nitrogen) of ultra high purity is an established commercial practice as is the delivery of such gases to the location of a semiconductor manufacturing facility. However, at the point-of-delivery, pressurized ultra high purity gas enters a distribution system which connects with semiconductor manufacture process equipment and the distribution system is known to be a potential source of gas contamination and in modern state-of-the-art systems precautions are routinely taken such as the use of electropolished stainless steel tubing and fixtures to provide the smoothest possible surfaces to avoid entrapment of impurities and efforts have been made to effect elimination of leaks and the avoidance of "dead spaces" in the system, i.e. places where contaminants can accumulate and are undiluted and provide a source of re-entrainment or re-entrance of impurities, i.e., a condition known in the art as a "virtual leak".*

* A "virtual leak" is so designated since the effect of re-entrainment and re-entrance of accumulated impurities from a "dead space" has the same effect as a leak of impurities into the system.

While the aforementioned problems are recognized and steps taken to avoid unsatisfactory conditions, state-of-the-art systems have not fully addressed these issues, particularly, the elimination of "dead spaces". Also, the important aspects of continuous downstream monitoring for impurities, improved purgability and minimization of welds (to lessen entrapment of impurities) in the distribution system have not been successfully addressed. In the recent publication "Design and Performance of the Bulk Gas Distribution System in The Advanced Semiconductor Technology Center (ASTC)", Bradley Todd—Proceedings of Microcontamination Conference, October, 1989, the problems of controlling contamination in distribution systems was presented and a system described in which problems were addressed; however, the problem of contaminant accumulation in "dead space" in the laterals branching from the distribution system main line was not addressed. Similarly, the publication "Ultra Clean Gas Delivery System", Kenneth R. Grosser—Technical Proceedings of Semcon/East, September, 1989 recognizes the problems associated with dead zones and discloses a system in which a loop was used in the main lines to maintain flow in major elements of the disclosed system but the matter of "dead space" in laterals branching from the main line was not addressed. Also, in the publication "Examining Performance of Ultra-High- Purity Gas, Water, and Chemical Delivery Subsystems," Tadahiro Ohmi, Yasuhiko Kasama, Kazuhiko Sugiyama, Yasumitsu Mizuguchi, Tasuyuki Yagi, Hitoshi Inaba, and Michiya Kawakami Microcontamination, March 1990 the problem of gas stagnation is fully recognized and a system with constant flow in gas lines is described, and also described is the use of an integrated valve to supply gas to four pieces of process equipment which is provided with a constant purge line so that the lines between the integrated valve and the process equipment inlets can be purged with small amounts of gas. It is fully accepted in the art that prevention of contamination in a gas distribution system is a critical concern of semiconductor manufacturers and the problem of contamination resulting from "dead space" in the distribution system is fully recognized but as yet no comprehensive solution has been presented.

SUMMARY OF THE INVENTION

The present invention is a continuous gas flow system for distributing gas or fluid to a plurality of outlets servicing process equipment such as the type used in semiconductor manufacturing operations; the gas supplied to the system can be very high purity argon, oxygen, nitrogen, hydrogen e.g. of 10 ppb or lower. The system of the invention comprises a main line conduit means in communication between a supply means for the continuous supply of pressurized gas, e.g. a pressurized tank, a liquified gas supply, or an air separation plant and a downstream venting means for continuously receiving pressurized gas from the system and continuously releasing gas from the system. The main line conduit means is provided in communication between the supply means and the venting means and a loop conduit means is also provided in communication with the supply means and the venting means. Lateral conduit means in communication with the main line conduit means branch from the main line conduit means and communicate with the loop conduit means. Pressurized gas flows from the supply means through the main line conduit means and the loop conduit means to the venting means, and from the main line conduit means through the lateral conduit means to the loop conduit means so that a flow of gas is continuously flowing through the main line, loop and lateral conduit means to the vent of the system. Valve means are provided in the lateral conduit means to pass pressurized gas to process equipment, the valve means being three port valves in which two ports are in direct serial communication with a lateral, with the third port being adjustably openable to provide pressurized gas to process equipment. All gas contacting surfaces of the distribution system are suitably electropolished, e.g. electropolished stainless steel, and the serial ports of the valve means have inner surfaces which smoothly join contiguous conduit inner surfaces and the adjusting means of the adjustable port of the three-port valve means is configured to avoid any significant "dead space" in the valve. All valves and devices installed in the distribution system are provided with smooth, polished, metal inner surfaces which smoothly join other inner surfaces of the distribution system.

BRIEF DESCRIPTION OF THE DRAWING

FIG. 6 shows a three-way valve suitable for venting the distribution system of the present invention; and FIGS. 7(A), 7(B) show the comparative advantage of the present invention with regard to the welding requirements.

DETAILED DESCRIPTION

Figure 1:
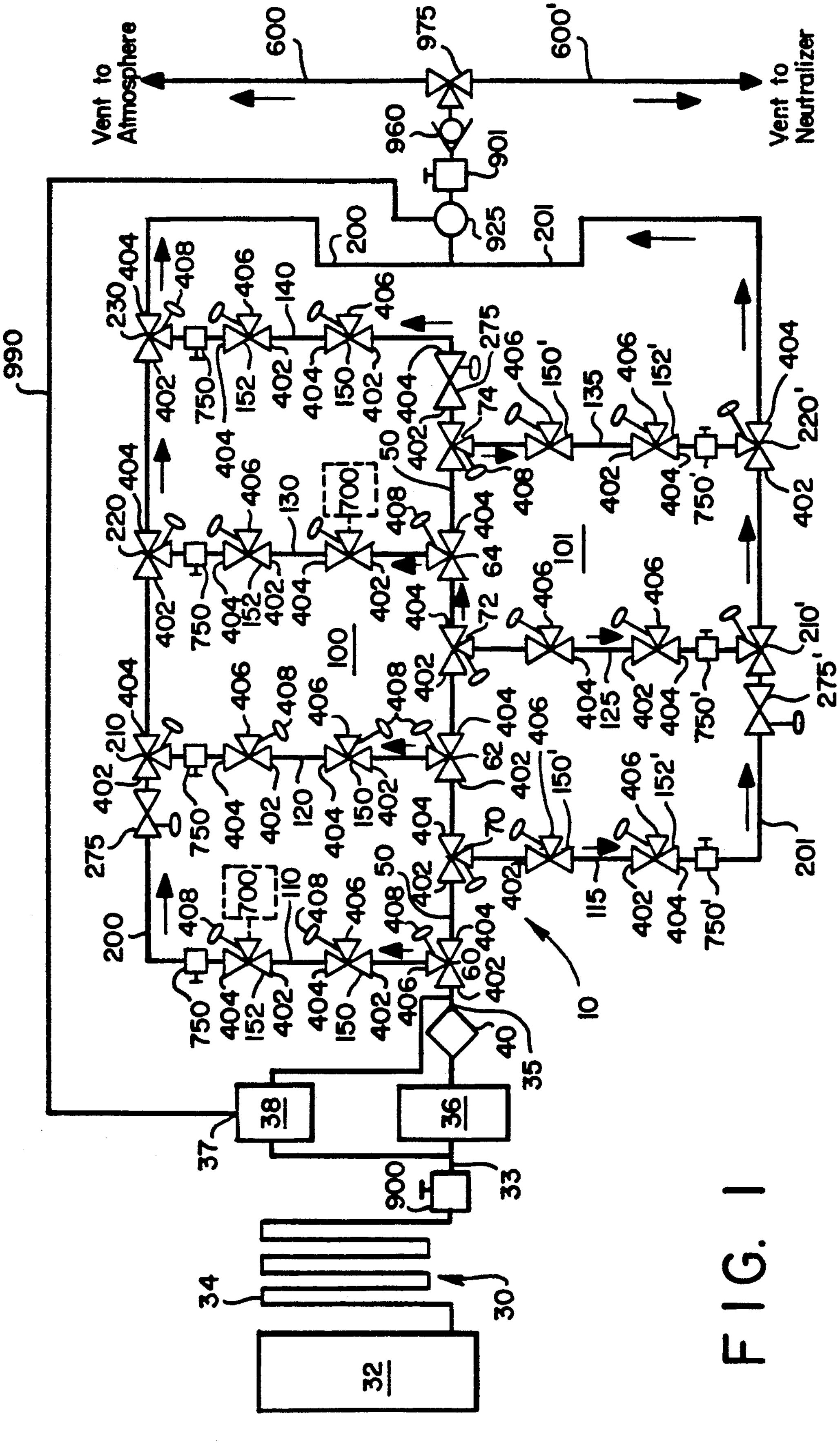
FIG. 1 is a schematic diagram illustrating an embodiment of the distribution system of the present inventions.
Figure 1A:
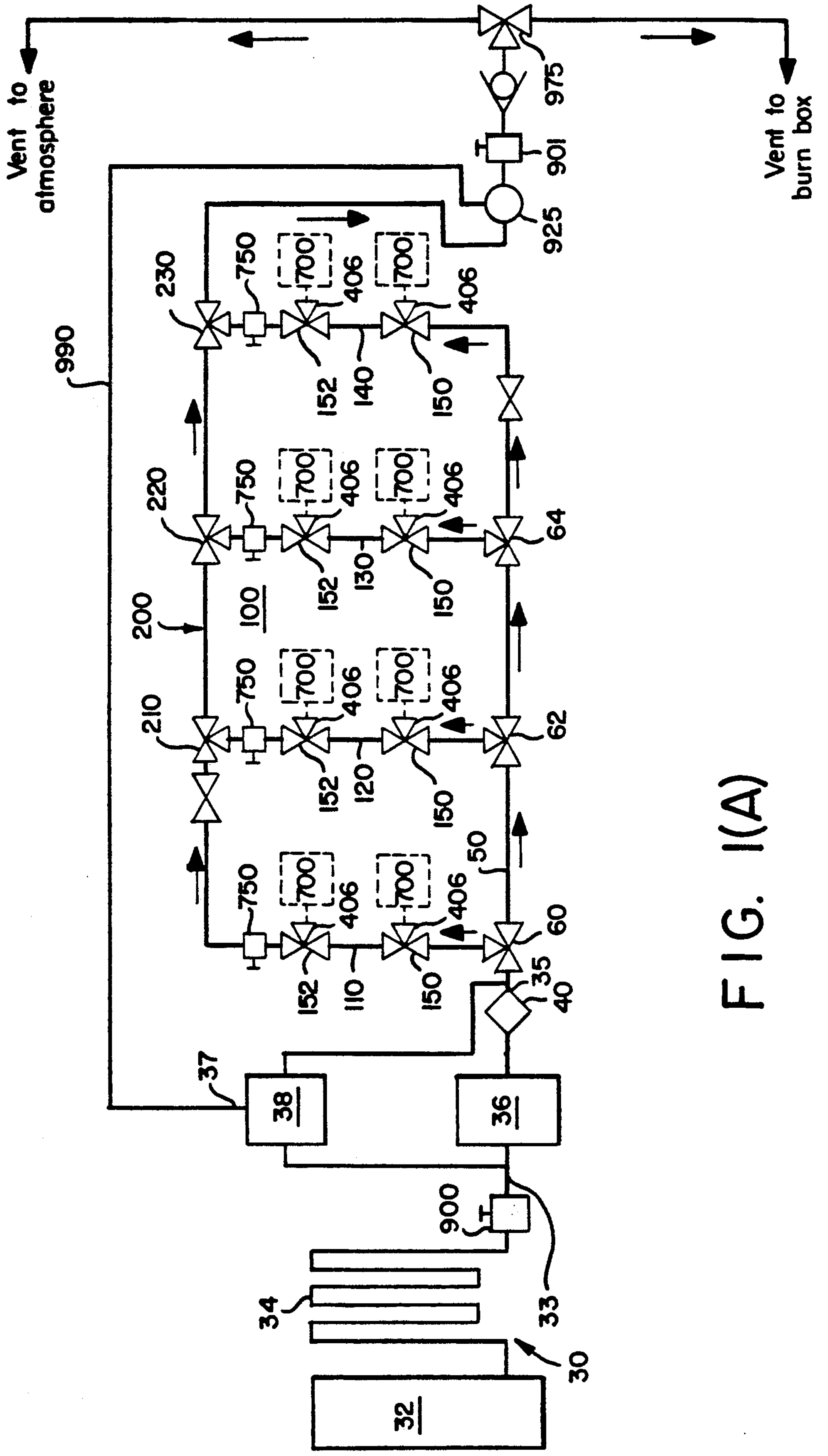
FIG. 1(A) is a schematic diagram of a distribution system of the present invention illustrating a single set of lateral conduits.
Figure 2:
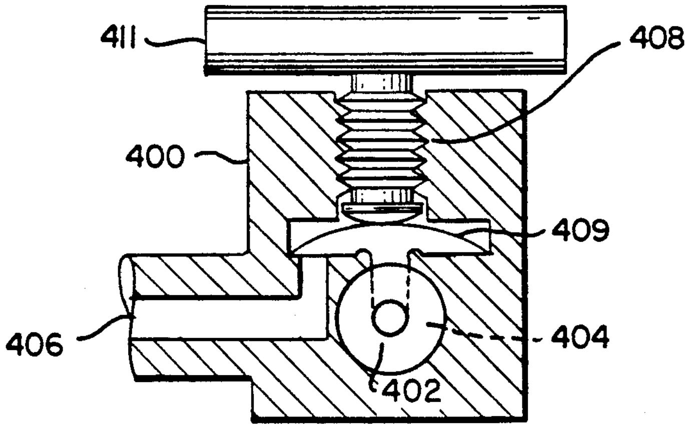
FIG. 2 is a sectional elevational view of a three-port valve suitable for use in the present invention and FIG. 2(A) is a perspective view of the valve of FIG. 2.
Figure 2A:
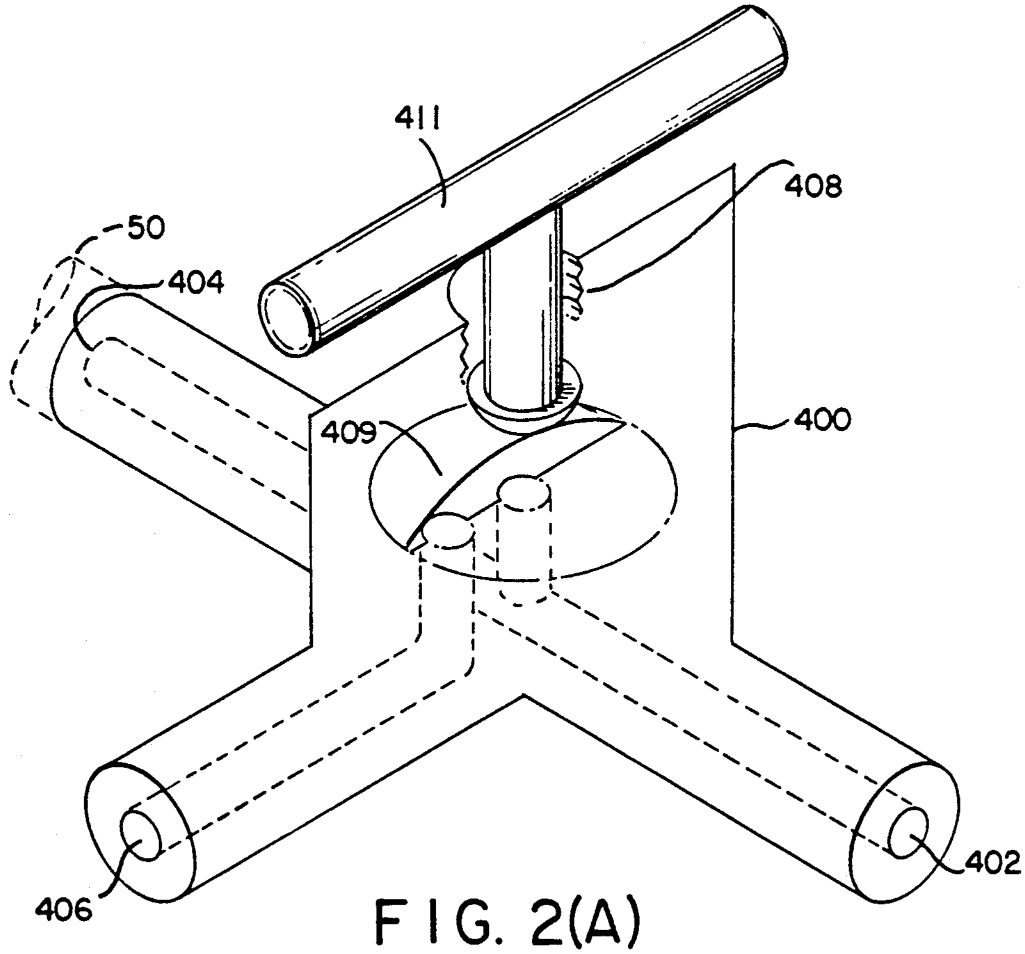

With reference to FIG. 1, a preferred embodiment of a gas distribution system in accordance with the present invention is indicated generally at 10 and includes a supply means 30 for continuously supplying high purity gas under pressure to system 10. Supply means 30 can include a commercially available liquified gas supply tank 32 suitably having electropolished stainless steel inner surfaces, a vaporizer 34, a system purification unit 36 e.g. containing absorbents and catalysts, and a gas purity monitor 38, e.g. including gas analyzers, dedicated analyzers for specific contaminants, e.g. hydrocarbons, water, toxic/flammable/corrosive components, and particle analyzers which continuously measure the level of impurities and contaminants including particles, in the gas supplied to the system at 33 and the purified gas filtered at 40 which enters the system at 35. Alternatively, an analyzer for multiple components such as an "APIMS" (Atmospheric Pressure Ionization Mass Spectrometer) can be used to monitor gas purity in the system. A sample of the impurity level of the gas going to vent from the system is continuously monitored at 37 as hereinafter described. A state-of-the-art particle filter system e.g. a cartridge type filter is provided at 40 upstream of main line conduit 50. Main line conduit, 50, suitably formed of electropolished stainless steel tubing is in communication with the supply means 30 of pressurized gas and includes in serial relation a near, or upstream, three port valve means 60 and downstream three port valves 62 and 64 for communication with a first set of laterals 100. A suitable configuration for a three-port valve (60, 62, 64) of main line conduit 50 is shown in FIG. 2 in which a valve body 400 is provided with two open ports 402, 404 which are in-line, open and in serial communication and a third port 406 with adjustable means 408, including flexible diagphragm 409 and valve control 411, for adjustably opening and closing port 406. Lateral set 100 is shown by itself in FIG. 1(A) and illustrates a particular embodiment of the present invention. For lateral set 100, i.e. laterals 110, 120, 130, 140 valve 64 represents a remote valve means and valve 62 is an intermediate valve means and valve 60 is the near or upstream valve means.

Additional lateral set 101, shown in FIG. 1, includes laterals 115, 125, 135 and for the additional lateral set 101 additional three port valve means 70, 72, 74 are provided in serial relation from upstream to downstream in main line conduit 50 and located respectively, adjacently downstream of the pre-existing three port valve bodies 60, 62, 64 of the main line conduit 50.

Correspondingly, lateral 110 is the near, or upstream lateral conduit means lateral 140 is the remote or downstream lateral conduit means, and laterals 120 and 130 are intermediate lateral conduit means for lateral set 100. Each of the lateral conduit means includes in serial communication a plurality of three-port valve means in a tandem array, i.e. a linear configuration, indicated at 150, 152 for lateral set 100 and 150', 152' for lateral set 101. Each valve means 150, 152 is of the type shown in FIG. 2 and has two open ports, upstream port 402 and downstream port 404, which are open and in serial communication with each other, and a third port 406 with adjustable means for opening and closing port 406 shown in more detail in FIG. 2. The opening of a port 406 of main line conduit valves 60, 62, 64 places the laterals of set 100 in fluid communication with main line conduit 50. Similarly, the opening of a port 406 of valves 70,72,74, places the laterals of set 101 in communication with the main line conduit 50.

Figure 1B:
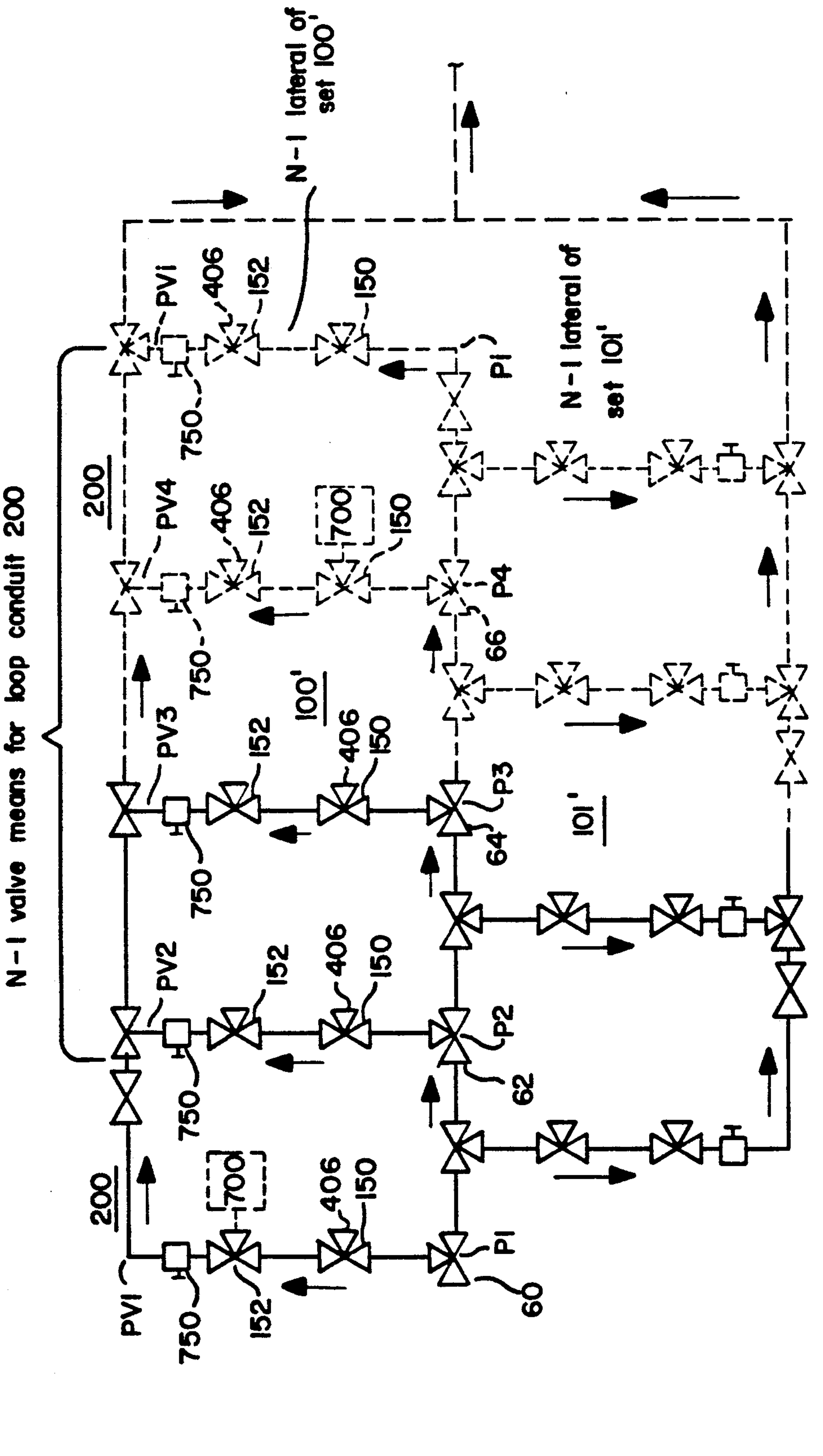
FIG. 1(B) is a schematic diagram illustrating a distribution system of the present invention for an increased number of lateral conduits.

An increased plurality of laterals in a set can be provided e.g. suitably up to hundreds or more is illustrated in FIG. 1(B).

With further reference to FIG. 1 (and FIG. 1(A)), in addition to main line conduit 50, and lateral sets 100, 101, a loop conduit 200 is provided for lateral set 100 and a corresponding loop conduit 201 is provided for lateral set 101. The loop conduit 200 is also suitably made of electropolished stainless steel tubing and includes in serial relation a plurality of three-port valves 210, 220, 230, of the type shown in FIG. 2 numbering one less than the number of laterals 110, 120, 130, 140. The valve means 210 is the near, or upstream valve means of loop conduit means 200 and is proximate, and downstream from, the near lateral conduit means 110; the valve means 230 is the remote valve means of loop conduit means 200 and is proximate the remote lateral conduit means 140. Valve means 220 is intermediate and in serial communication between near valve means 210 and remote valve means 230 and the near valve means 210 has its upstream open port 402 in serial communication with the downstream open port 404 of the valve body 152 at the end of the tandem array of the near lateral conduit means 110. The remote valve means 230 of loop conduit means 200 has its downstream open port 404 in communication with vent means 600. The adjustable ports 406 of each of the valve bodies 210, 220, 230 of the conduit loop means 200 are respectively in serial communication with a downstream open port 404 of a valve body 152 which ends the tandem array of the intermediate and remote lateral conduit means 120, 130 and 140.

Figure 3:
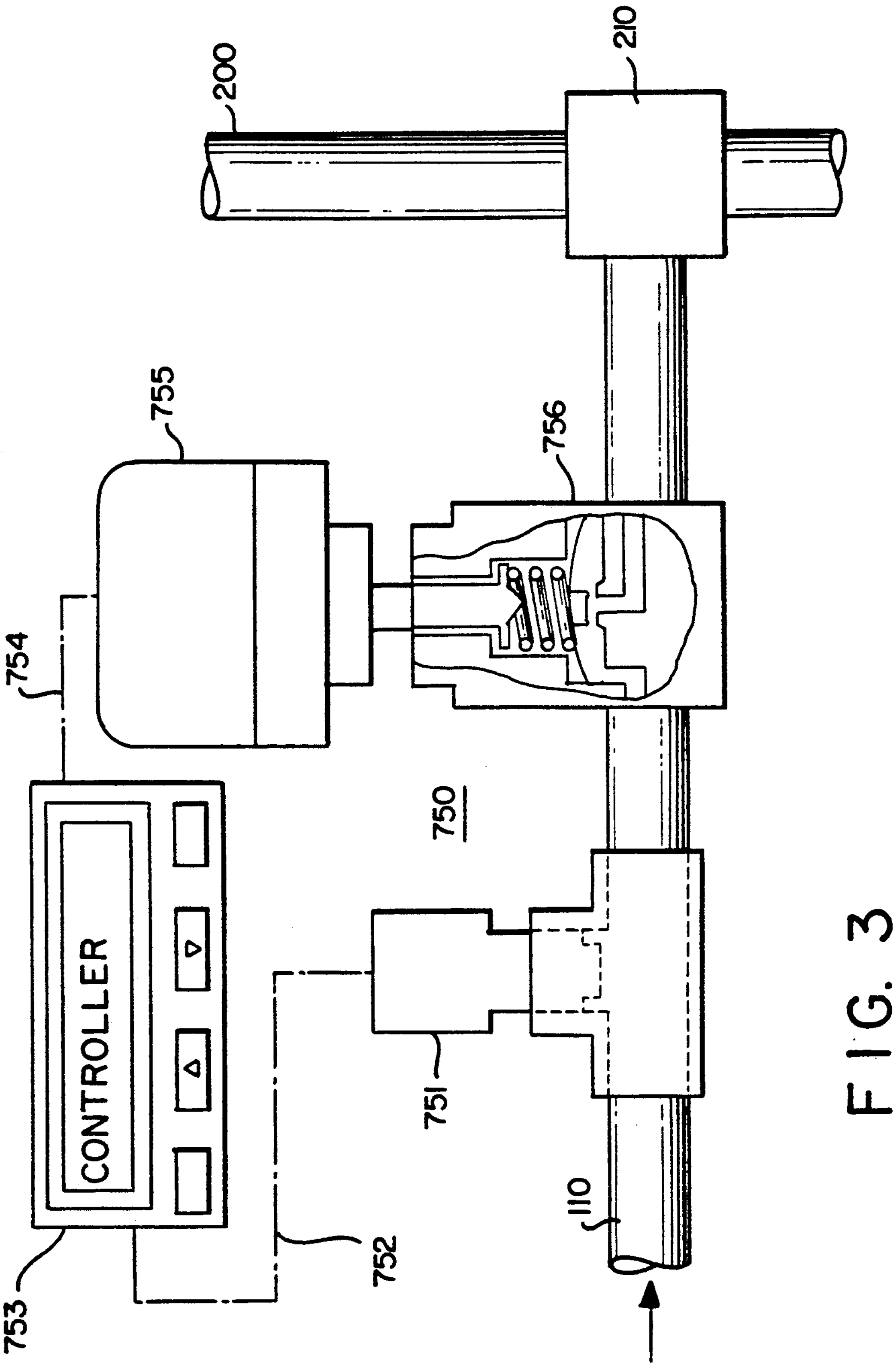
FIG. 3 shows a back pressure regulating system comprised of a back pressure regulator, a pressure sensor and a pressure controller suitable for use in the present invention.

In operation of distribution system 10, and with reference to FIG. 1 and the lateral set 100, of FIG. 1(A), pressurized, e.g. 120 psi, very high purity gas, e.g. argon, nitrogen, hydrogen, oxygen typically at less than 10 ppb impurities is delivered from supply means 30 through purification means 36 and particle filtration system 40 to main line conduit 50. With the adjustable valves 406 of all of the three-port valves of the laterals 110, 115, 120, 125, 130, 135, 140, loop conduits 200, 201 and main line conduit 50 closed, and the adjustable two-port valves 275 closed, there is no gas flow in the system and in this condition any valve or component of the system 10 can be removed for maintenance or replacement without disturbance of the system. It is also possible to close off any lateral individually for maintenance or replacement purposes. Upon opening of the aforementioned adjustable valves, with reference to lateral set 100, pressurized gas flows from the main line conduit 50 to the laterals and flows from the laterals 110, 120, 130, 140 to loop conduit means 200 and to vent 600. When pressurized high purity gas is required for a process equipment 700, opening of its associated adjustable valve 406 provides the pressurized gas supply. Back pressure regulators 750 are provided between the respective three-port valve means 152, which end the respective lateral conduit means 110, 120, 130, 140, and the conduit means 200. Back pressure regulators 750 are adjustably set so that those increased demands from upstream valves 150, 152 which cause a momentary pressure drop in a lateral conduit will be compensated by the back pressure regulator 750 to maintain the initially set pressure in the lateral e.g. 110 psi. A schematic illustration of a suitable conventional back pressure regulator system 750 is shown in FIG. 3 where a pressure sensor 751 is positioned in lateral conduit 110, for example, and the sensed pressure level is communicated electrically via line 752 to a conventional controller 753. If the sensed pressure is less than the set pressure, a signal 754 from controller 753 to regulator control 755 will close the regulator valve 756 slightly to maintain the set pressure and if the sensed pressure is more than the set pressure, then opens slightly to release excess pressure. Pressure is maintained in lateral conduit 110 so that a gas flow is continuously maintained as indicated by the arrow flow in FIG. 1 (and FIG. 1(A)) during gas demand to process equipment 700, and also when all of the adjustable valves 406 of three-port valves 150, 152 are closed and with no gas flowing to the process equipment. In operation, routine adjustment of system inlet forward pressure regulator system 900 and back pressure regulator system 901 will enable gas to flow from gas supply 30 to vent 600/600' via main line conduit 50 and loop conduit 200 (and 200'.) The optional use of back pressure regulators at the downstream end of the laterals can facilitate the establishment of the desired gas flow. By way of example, with the adjustable ports 406 of the main line conduit three-port valves 60, 62, 64, 70, 74 open, and with the adjustable valves of the loop conduit three-port valves 210, 220, 230 (210', 220') open, the gas supply at 30 could be set at forward pressure regulator system 900 so that the pressure of the gas at valve means 60 and in the main line conduit 50 is essentially 120 psi, a typical distribution system pressure, and with back pressure regulator system 750 set to about 110 psi, and back pressure regulator system 901 set to about 100 psi gas will flow through the system in the direction shown by the arrows, from the main line conduit 50 via the laterals 110, 115, 120, 125, 130, 135, 140 through the loop conduit 200 (200') to the vent means 600/600'. For the foregoing situation with reference to FIG. 1(() for lateral set 100:

$$P1 \geqq P2 \geqq P3 \geqq P4\text{—}Pi$$

$$PV1 > PV2 > PV3 > PV4\text{—}PVi$$

$$Pi > PV1$$

Figure 4:
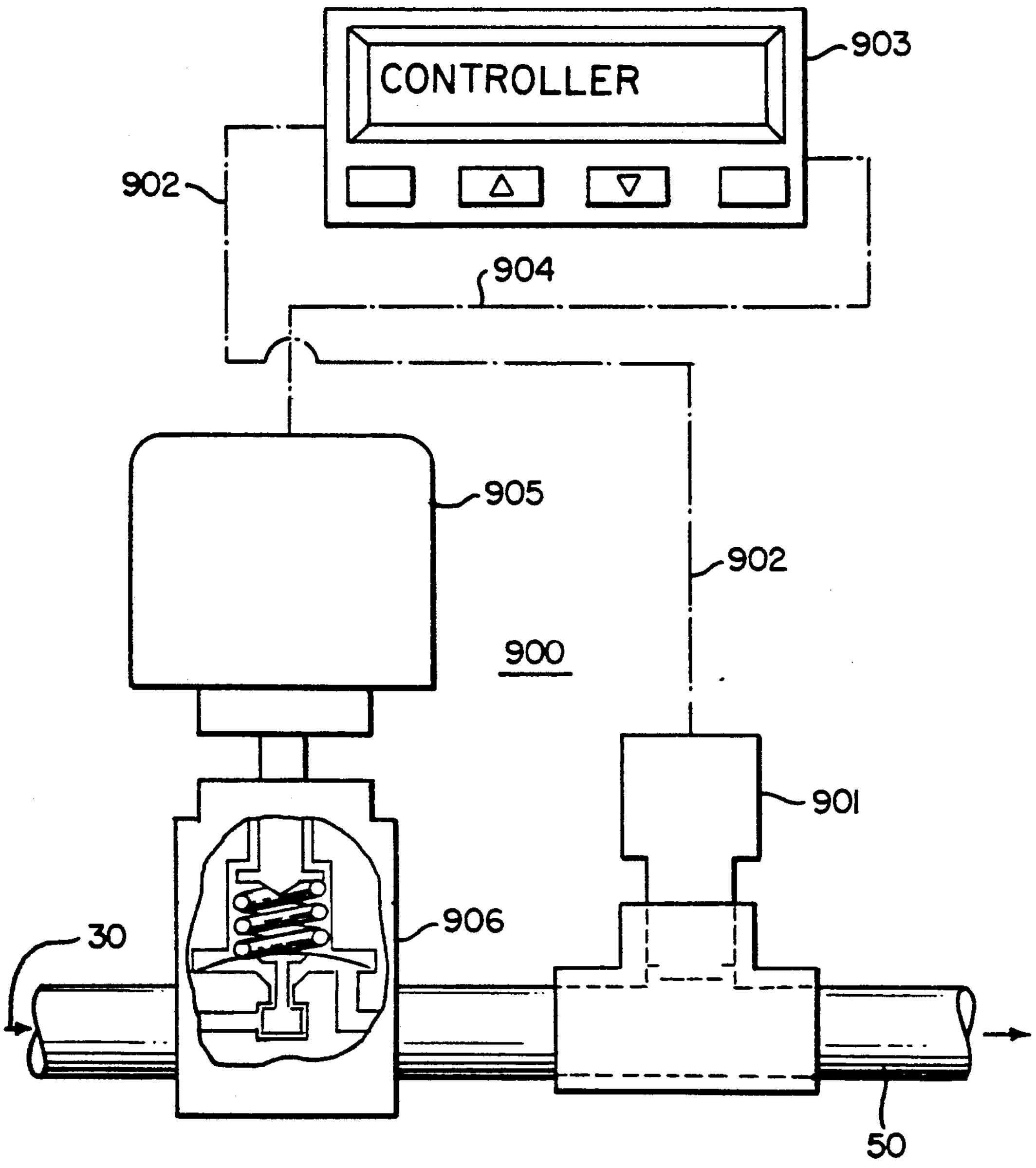
FIG. 4 shows a forward pressure regulator system comprised of a forward pressure regulator, a pressure sensor, and a pressure controller suitable for use in the present invention.
Figure 5:
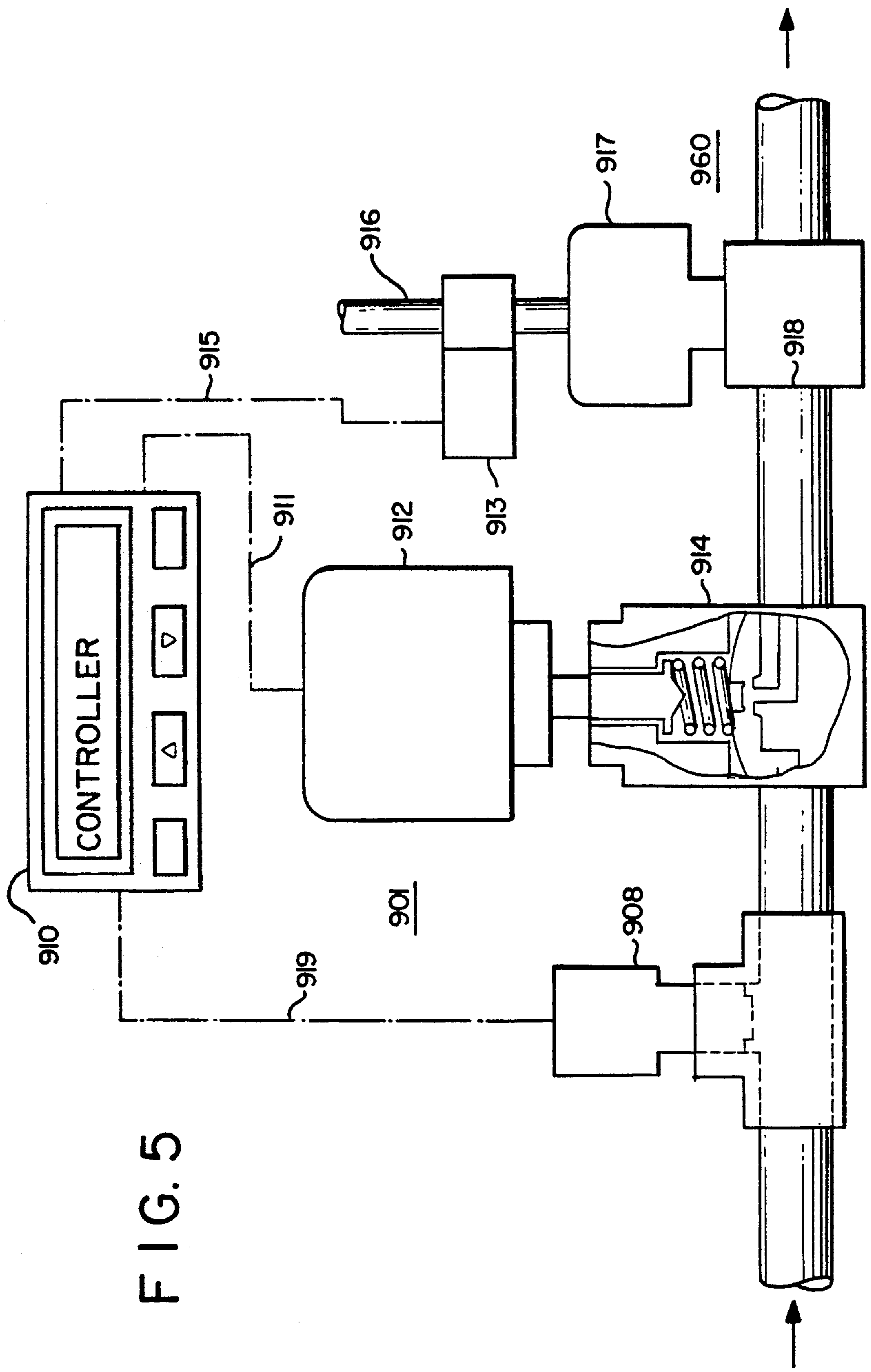
FIG. 5 shows a back pressure regulating system and valve arrangement suitable for use at the exit of the distribution system of the present invention.

With further reference to FIG. 5, shut-off valve 960 is a conventional valve arrangement to protect the distribution system in the event of loss in pressure and acts to close the system to the atmosphere and vent. Three-way valve 975 shown in FIG. 1 is adjustable automatically or manually, to allow pressurized gas from the system to continuously flow from the distribution system 10 to vent 600 and the atmosphere or, when contaminants, e.g. toxic, corrosive, flammable, contaminants are detected at 37, to vent 600' and a "burn box" or other neutralizing device such as a scrubber. FIG. 4, with reference to FIG. 1, shows a conventional schematic arrangement for forward pressure regulator system 900 at the inlet of the system where the forward pressure is sensed at 901 and an electrical signal sent via 902 to controller 903 for comparison with the set pressure e.g. 120 psi. If the sensed pressure is different from the set pressure, a signal via 904 from controller 903 to regulator control 905 will either slightly close the regulator valve 906 to reduce the pressure to the set valve or slightly open the regulator valve 906 to raise the pressure to the set valve. FIG. 5 shows a suitable conventional arrangement for back pressure regulator system 901 at the outlet of the system where the outlet pressure is sensed at 908 and an electrical signal sent via 919 to its controller 910 for comparison with the set loop conduit pressure e.g. 100 psi. If the sensed pressure is not the same as the set pressure a signal via 911 to regulator control 912 will slightly close the regulator valve 914 if pressure increase is required or slightly open valve 914 if pressure decrease is required to re-establish the set pressure as aforedescribed. FIG. 5 also shows an arrangement for two-way shut-off valve 960 where a signal from controller 910 via 915 to a solenoid valve 913, upon a loss in gas pressure from the system as sensed at 908 will allow pressure from pressure source 916 to close port 918 of normally open shut-off valve 960. FIG. 6, with reference to FIG. 1, shows a conventional arrangement for three-way valve 975 which is adjustable at 971 to position closure 974 to allow gas from distribution system 10 to continuously flow through port 972 to the atmosphere via vent 600, or though port 973 to a neutralizing device via vent 600' when an abnormality such as a flammable, toxic, or corrosive gas is detected by monitoring system 38 via sample line 990.

FIGS. 7(A) and 7(B) show comparatively the advantage of the present invention in reducing the amount of welds required in a distribution system. FIG. 7(A) shows a conventional prior art distribution system lateral arrangement with a conventional T-connection at 800 and a two-way valve at 820 which is opened and closed to provide gas to a process system tool. In the arrangement illustrated in FIG. 7(A), five welds 830 are required. FIG. 7(B) showing the lateral arrangement of the distribution system of the present invention demonstrates that only three welds, 830' are required. Due to the continuous flow of gas through the system 10 in the directions as previously described, an ongoing continuous sampling of the gas in the system for impurities and contaminants including particles can be obtained from sampling probe 925 at the outlet of the system through line 990 to monitoring device 38. As a result, a continuous check, or certification of the system is enabled and also, a gas sample at 37 can be continuously observed and compared with gas at 35 from supply means 30 to detect any abnormalities.

As is clear from the foregoing description, "dead spaces" are eliminated from the system by continuous flow through the main, laterals, and loop conduits and the risk of contamination build-up in the system is minimized. Also, installation of the system permits the use of fewer welds as compared to conventional systems as shown in FIG. 7(A) and 7(B) which further reduces the build-up of contaminants in the system.

The gas distribution system of the present invention provides a system in which contamination is minimized by enabling continuous gas flow, virtual elimination of "dead spaces", ease of purgability, continuous real-time monitoring of gas entering and leaving the system and the requirements of fewer welds in the system.

The elimination of "dead spaces" essentially eliminates "virtual leaks" and enables rapid purging of the entire system and rapid "start-up" as compared to conventional systems where "dead spaces" and "virtual leaks" prolong the required purging times.

While the foregoing has been primarily directed to a gas distribution system, the present invention can be used for the distribution of pumped, i.e. pressurized liquids using suitably appropriate materials of construction known to the art. In particular, D.I. water (de-ionized) can be effectively distributed e.g. in polymeric tubing, such as PVC, and the elimination of "dead spaces" minimizes the opportunity for bacterial growth which is an important consideration in semiconductor and pharmaceutical applications. Dead spaces and continuous flow prevent bacterial growth.

What is claimed is:

1. A continuous flow distribution system for distributing gas or fluid to a plurality of outlets comprising (i) supply means for continuously introducing pressurized fluid or gas into said system;

(ii) venting means downstream from said supply means for continuously receiving pressurized gas or fluid and for releasing pressurized fluid or gas from said system;

(iii) main line conduit means in communication with said supply means, said main line conduit means including in a serial relation therewith a plurality of three-port valve bodies which includes a near valve body proximate the supply means, a remote valve body, and at least one intermediate valve body in serial relation between said near and remote valve bodies, each said three-port valve body having first and second open ports which are in serial communication with each other and a third port with adjustable means for adjustably opening and closing said third port, said near valve body having an open port thereof in serial communication with said supply means;

(iv) at least one set of a plurality of lateral fluid or gas distribution conduit means for said main line conduit means including near lateral conduit means in communication with the third port of said near valve body, remote lateral conduit means in communication with an open port of said remote valve body and intermediate lateral conduit means respectively in communication with a said third port of a said intermediate valve body, each said lateral conduit means including in serial communication therewith a plurality of three-port valve bodies in a tandem array, each such three-port valve body having two open ports which are in serial communication with each other and a third port with adjustable means for adjustably opening and closing said third port for withdrawal of fluid or gas from the system, each said tandem array ending with an open port of a valve body of such array;

(v) loop conduit means for one of a said set of a plurality of lateral conduit means including in serial relation therewith a plurality of three-port valve bodies numbering one less than the number of lateral distribution conduit means of a said set, which plurality includes a near valve body proximate the near lateral conduit means, a remote valve body proximate the remote lateral conduit means and at least one intermediate valve body in serial relation between the near and remote valve bodies, each said three-port valve body of said plurality having two open ports which are in serial communication with each other and a third port with adjustable means for adjustably opening and closing said third port;

said near valve body of said loop conduit means having a said open port in serial communication with a said open port of the valve body ending the tandem array of the near lateral conduit means, said remote valve body of said loop conduit means having a said open port in serial communication with said vent means, and the third port of each of the valve bodies in the loop conduit means being respectively in serial communication with a said open port of a valve body ending the tandem array of the remote and intermediate lateral conduit means.

2. A system in accordance with claim 1 in which;

(i) additional one or more three-port valve bodies are included in serial relation from upstream to downstream in the main conduit means being located respectively adjacently downstream of the pre-existing three-port valve bodies of said conduit means, each said three-port valve body having first and second open ports in serial communication with each other and a third port with adjustable means for adjustable opening and closing said third port;

(ii) additional separate lateral conduit means in communication with a said third port of each said additional three-port valve body, each said additional lateral conduit means including in serial communication therewith a plurality of three-port valve bodies in a tandem array, each valve body having two open ports in serial communication with each other and a third port with adjustable means for adjustable opening and closing said third port for withdrawal of fluid or gas from the system, each said tandem array ending with an open port of a valve body of such array;

(iii) an additional loop conduit means including in serial relation therewith one or more three-port valve bodies numbering one less than the number of said additional lateral distribution conduit means which includes an upstream valve body proximate the most upstream additional lateral conduit means, a downstream valve body proximate the most downstream lateral conduit means and one or more intermediate valve bodies in serial relation between the upstream and downstream valve bodies, each said three-port valve body having two open ports which are in serial communication with each other and a third port with adjustable means for adjustably opening and closing said third port;

said upstream valve body of said additional loop conduit means having a said open port in serial communication with a said open port of the valve body ending the tandem array of the upstream lateral conduit means, said downstream valve body of said additional loop conduit means having a said open port in serial communication with said venting means, and the third port of each of the valve bodies in the additional loop conduit means being respectively in serial communication with a said open port of a valve body ending the tandem array of the downstream and intermediate lateral conduit means.

3. A system in accordance with claim 1 wherein a back pressure regulating means is included in each lateral conduit in communication with the open port venting the tandem array of such lateral conduit means and the port of the respective valve body of the additional loop conduit means which is in serial communication with said open port ending such tandem array.

4. A system in accordance with claim 1 wherein sample conduit means are provided in communication with said venting means for providing a bleed of a continuous sample of the stream of the gas or fluid continually released from the system.

5. A system in accordance with claim 1 wherein the venting means includes valve means for alternately releasing pressurized gas or fluid to the atmosphere or to purification means.

6. A system in accordance with claim 1 wherein a first two-way valve is in serial communication between the open port of the remote valve body and the remote lateral conduit means and a second two-way valve is in serial communication between the open port of the near valve body and the open port of the valve body and the open port of the valve body ending the tandem array of the near lateral conduit means.

7. A continuous flow distribution system for distributing gas or fluid to a plurality of outlets comprising (i) supply means for continuously introducing pressurized fluid or gas into said system;

(ii) venting means downstream from said supply means for continuously receiving pressurized gas or fluid and for releasing pressurized fluid or gas from said system;

(iii) main line conduit means in communication between said supply means and said venting means;

(iv) loop conduit means in communication between said supply means and said venting means;

(v) lateral conduit means in communication from said main conduit means to said loop conduit means;

(vi) a plurality of outlet valve means in said lateral conduit means each said outlet valve means having first and second ports which are in serial communication with each other and a third port with adjustable means for adjustably opening and closing said third port.

8. Method for providing continuous gas or fluid flow from a supply of pressurized gas or liquid through a main line to a vent to a lower pressure than the main line pressure and to lateral conduits branching from the main line having ends remote from the main line and having adjustably openable outlets for the supply of pressurized gas or liquid; said method comprising (i) passing pressurized gas or fluid through the main line from the supply or pressurized gas to a vent and from the vent to a lower pressure environment than the main line;

(ii) providing pressurized gas or fluids from the mainline to the laterals including the remote ends of the laterals; and (iii) providing a path joining the ends of the laterals for the flow of pressurized gas or fluid from the end of each lateral to the vent.

* * * * *